United States Patent
Horimizu et al.

(10) Patent No.: US 11,067,109 B2
(45) Date of Patent: Jul. 20, 2021

(54) ENGAGEMENT STRUCTURE

(71) Applicant: NIHON PLAST CO., LTD., Fujinomiya (JP)

(72) Inventors: Yasumasa Horimizu, Fujinomiya (JP); Atsushi Ihara, Fujinomiya (JP)

(73) Assignee: NIHON PLAST CO., LTD., Fujinomiya (JP)

( * ) Notice: Subject to any disclaimer, the term of this patent is extended or adjusted under 35 U.S.C. 154(b) by 702 days.

(21) Appl. No.: 15/868,864

(22) Filed: Jan. 11, 2018

(65) Prior Publication Data
US 2018/0202478 A1 Jul. 19, 2018

(30) Foreign Application Priority Data

Jan. 18, 2017 (JP) .............................. JP2017-006719

(51) Int. Cl.
| F16B 5/06 | (2006.01) |
| F16B 17/00 | (2006.01) |
| B62D 27/04 | (2006.01) |
| B62D 25/08 | (2006.01) |
| F16B 21/08 | (2006.01) |

(52) U.S. Cl.
CPC ............ F16B 5/0664 (2013.01); F16B 17/00 (2013.01); B62D 25/081 (2013.01); B62D 27/04 (2013.01); F16B 21/086 (2013.01)

(58) Field of Classification Search
CPC ...... F16B 17/00; F16B 5/0664; F16B 21/086; B62D 27/04; B62D 25/08; B62D 25/081
See application file for complete search history.

(56) References Cited

U.S. PATENT DOCUMENTS 3,230,592 A * 1/1966 Hosea ...................... B60J 10/80
24/297
4,626,155 A * 12/1986 Hlinsky .................. B60P 7/132
114/75

(Continued)

FOREIGN PATENT DOCUMENTS

| JP | 2006348999 A | 12/2006 |
| JP | 2008247223 A | 10/2008 |

OTHER PUBLICATIONS

First Office Action for related CN App No. 201810048724.1 dated Mar. 29, 2019, 13 pgs.

*Primary Examiner* — Matthew R McMahon
(74) *Attorney, Agent, or Firm* — Procopio, Cory, Hargreaves & Savitch LLP

(57) ABSTRACT

An engagement structure engages a first part with a second part, and includes a receive portion provided on the first part and an insertion portion provided on the second part. The insertion portion includes an insertion main body protruded in its insertion direction to the receive portion, and protrusions protruded from a side face of the insertion main body and having elasticity to be deformable. The receive portion includes an opening provided with an opening main portion into which the insertion main body is inserted and cutouts into which the protrusions are inserted when the insertion main body is inserted into the opening main portion, and overhangs that are disposed adjacently to the opening main portion to prevent, on a back surface of the receive portion, the protrusions from being pulled out due to elastic restorations of the protrusions that have passed through the cutouts.

5 Claims, 7 Drawing Sheets

(56) References Cited

U.S. PATENT DOCUMENTS

| | | | | |
|---|---|---|---|---|
| 5,142,834 A | * | 9/1992 | Laclave | B60R 13/04 |
| | | | | 24/453 |
| 5,448,804 A | | 9/1995 | Warren | |
| 5,454,479 A | * | 10/1995 | Kraus | B62D 25/24 |
| | | | | 220/787 |
| 5,658,110 A | * | 8/1997 | Kraus | B62D 25/24 |
| | | | | 411/510 |
| 6,342,286 B1 | * | 1/2002 | Hollingshead | G09F 7/18 |
| | | | | 24/297 |
| 7,748,089 B2 | * | 7/2010 | Jalbert | F16B 5/0657 |
| | | | | 24/297 |
| 7,967,539 B2 | * | 6/2011 | Huet | F16B 5/065 |
| | | | | 411/508 |
| 8,393,058 B2 | * | 3/2013 | Okada | F16B 21/086 |
| | | | | 24/297 |
| 8,495,802 B2 | * | 7/2013 | Okada | B60R 13/0206 |
| | | | | 24/297 |
| 9,200,660 B2 | * | 12/2015 | Tisol, Jr. | F16B 21/02 |
| 10,668,871 B2 | * | 6/2020 | Yon | F16B 21/086 |
| 2015/0174740 A1 | * | 6/2015 | Morris | B60R 13/0206 |
| | | | | 29/559 |
| 2019/0113062 A1 | * | 4/2019 | Liu | F16B 13/124 |
| 2020/0063778 A1 | * | 2/2020 | Dorschner | F16B 21/04 |

* cited by examiner

ENGAGEMENT STRUCTURE

CROSS-REFERENCE TO RELATED APPLICATIONS

The present application claims the benefit of a priority under 35 U.S.C § 119 to Japanese Patent Application No. 2017-6719, filed on Jan. 18, 2017, the entire contents of which are incorporated herein with reference.

BACKGROUND OF THE INVENTION

Technical Field

The present invention relates to an engagement structure for engaging a first part with a second part.

Background Arts

Conventionally, various parts made of synthetic resin are used for a vehicle, e.g. a cowl top cover that is disposed between a rear end of an engine hood and a front end of a front windshield in an automobile and covers a cowl portion to improve appearance. Japanese Patent Application Publication No. 2008-247223 discloses a configuration there a cowl top cover where the cowl top cover is composed of a cover main body (=a first part) and a vertical wall (=a second part). The first and second parts are made independently from each other. The vertical wall is attached to the cover main body to prevent something from entering into an engine compartment. In this configuration, the vertical wall is engaged with the cover main body by inserting engagement portions (engagement protrusions) protruded from the vertical wall into receive portions (engagement holes) formed on the cover main body.

However, for engaging such two parts initially independent from each other to fix them with each other, desired is an engagement structure whose engagement can be easily done and whose engagement is hardly separated. Japanese Patent Application Publication No. 2006-348999 discloses a configuration where an anchor portion is formed to have a twisted plate shape and the anchor portion is inserted into a slit-shaped receive portion while being twisted. In this configuration, resistances such as frictions tend not to occur when inserting the anchor portion into the slit-shaped receive portion, and then the anchor portion already inserted in the receive portion is hardly pulled out from the receive portion.

SUMMARY OF THE INVENTION

As explained above, improvement of workability is desired in a configuration for surely engaging a first part and a second part with each other. Therefore, an object of the present invention is to provide an engagement structure that can effectively engage a first part with a second part with superior workability.

An aspect of the present invention provides an engagement structure for engaging a first part with a second part comprising: a receive portion provided on the first part; and an insertion portion provided on the second part to be inserted into the receive portion and then fixed with the receive portion, wherein the insertion portion includes: an insertion main body protruded in an insertion direction toward the receive portion, and a plurality of protrusions protruded from a side face of the insertion main body to extend along a protrusion direction of the insertion main body and having elasticity to be deformable, and the receive portion includes: an opening provided with an opening main portion into which the insertion main body is inserted and a plurality of cutouts into which the protrusions are inserted when the insertion main body is inserted into the opening main portion, and a plurality of overhangs that are disposed adjacently to the opening main portion so as to contact with the protrusions being inserted into the cutouts in a direction perpendicular to the insertion direction of the protrusions and prevent, on a back surface of the receive portion, the protrusions from being pulled out due to elastic restorations of the protrusions that have passed through the cutouts.

According to the aspect, while inserting the insertion portion into the receive portion, the protrusions are pushed by the overhangs so as to be bent toward the cutouts, respectively. Therefore, the insertion portion can pass through the receive portion with a small insertion force. In addition, the protrusions after passing through the receive portion restore can be held by the overhangs due to their elastic restorations from their bent states while ensuring sufficient overlaps with the overhangs, respectively. As a result, the first and second parts can be effectively engaged with each other with good workability.

It is preferable that each of the protrusions includes: an inclined portion positioned at a free end side of the insertion main body and inclined with respect to the insertion direction of the insertion main body, and a protrusion main body positioned on a base end side of the insertion main body and extending along the insertion direction of the insertion main body.

According to this configuration, each of the protrusions is twisted at its inclined portion and its protrusion main body. Therefore, only by inserting the insertion portion into the receive portion, each of the protrusions can be easily bent toward the cutout by being pushed by the overhang, and thereby the insertion portion can pass through the receive portion with a smaller insertion force. As a result, the first and second parts can be effectively engaged with each other with superior workability.

It is preferable that the receive portion further includes a tapered portion formed on an inner edge of the opening and inclined so as to protrude inward and toward the insertion direction of the insertion portion.

According to this configuration, the insertion portion is guided into the opening in the insertion direction by the tapered portion, and thereby the insertion portion can be inserted into the opening more easily.

It is preferable that the engagement structure further comprises anti-rotation portions provided on a back surface of the receive portion of the first part to contact, in a direction perpendicular to the insertion direction of the insertion portion, with the protrusions of the insertion portion that have inserted in the opening at opposite positions to the cutouts, respectively.

According to this configuration, relative rotations of the first and second parts can be prevented by contacts of the protrusions with the anti-rotation portions.

DESCRIPTION OF THE EMBODIMENTS

Hereinafter, a first embodiment will be explained with reference to the drawings.

Figure 4A:
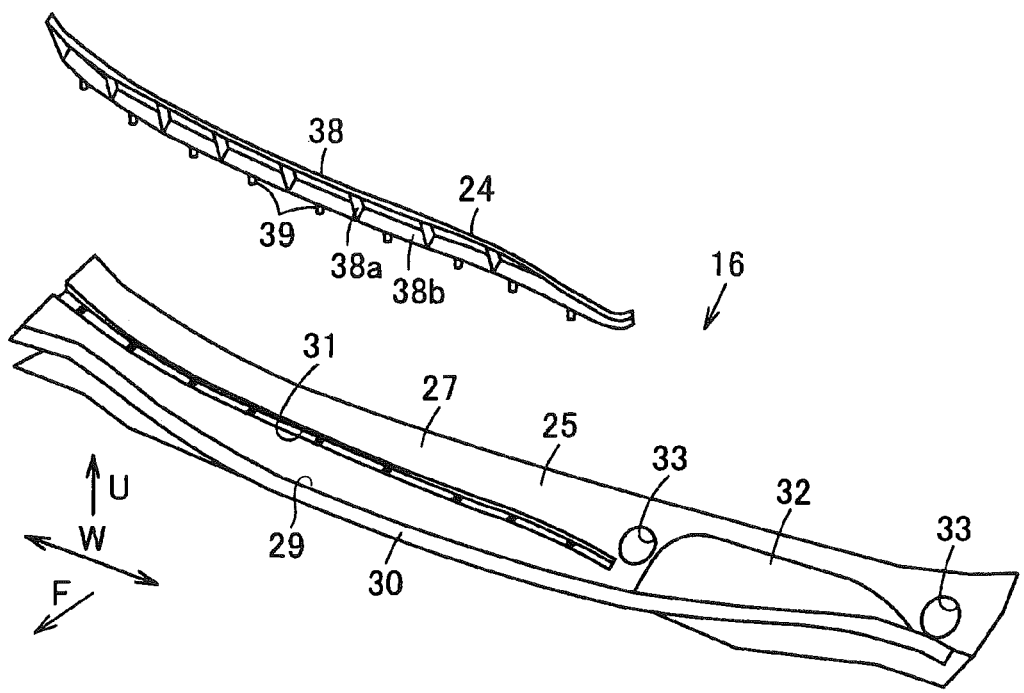
FIG. 4A is an exploded perspective view of a part for a vehicle that includes the engagement structures.
Figure 4B:
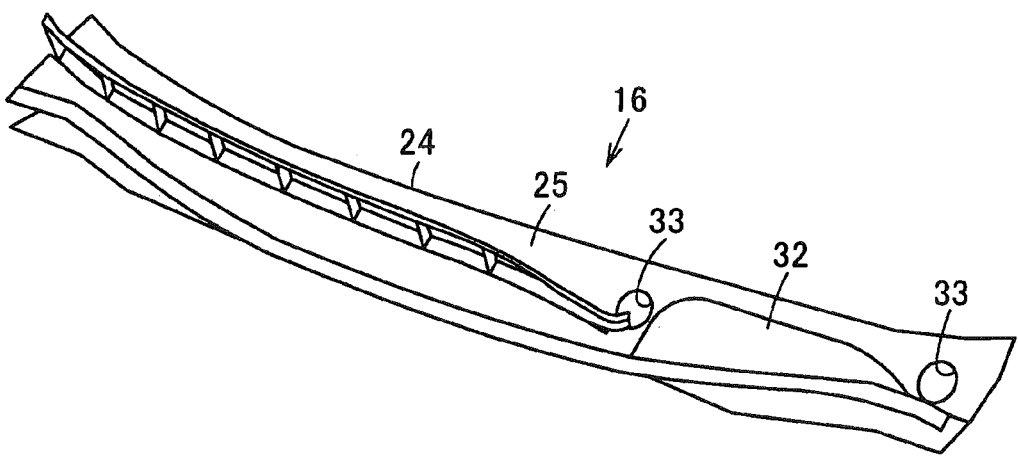
FIG. 4B is a perspective view of the part for a vehicle.
Figure 5:
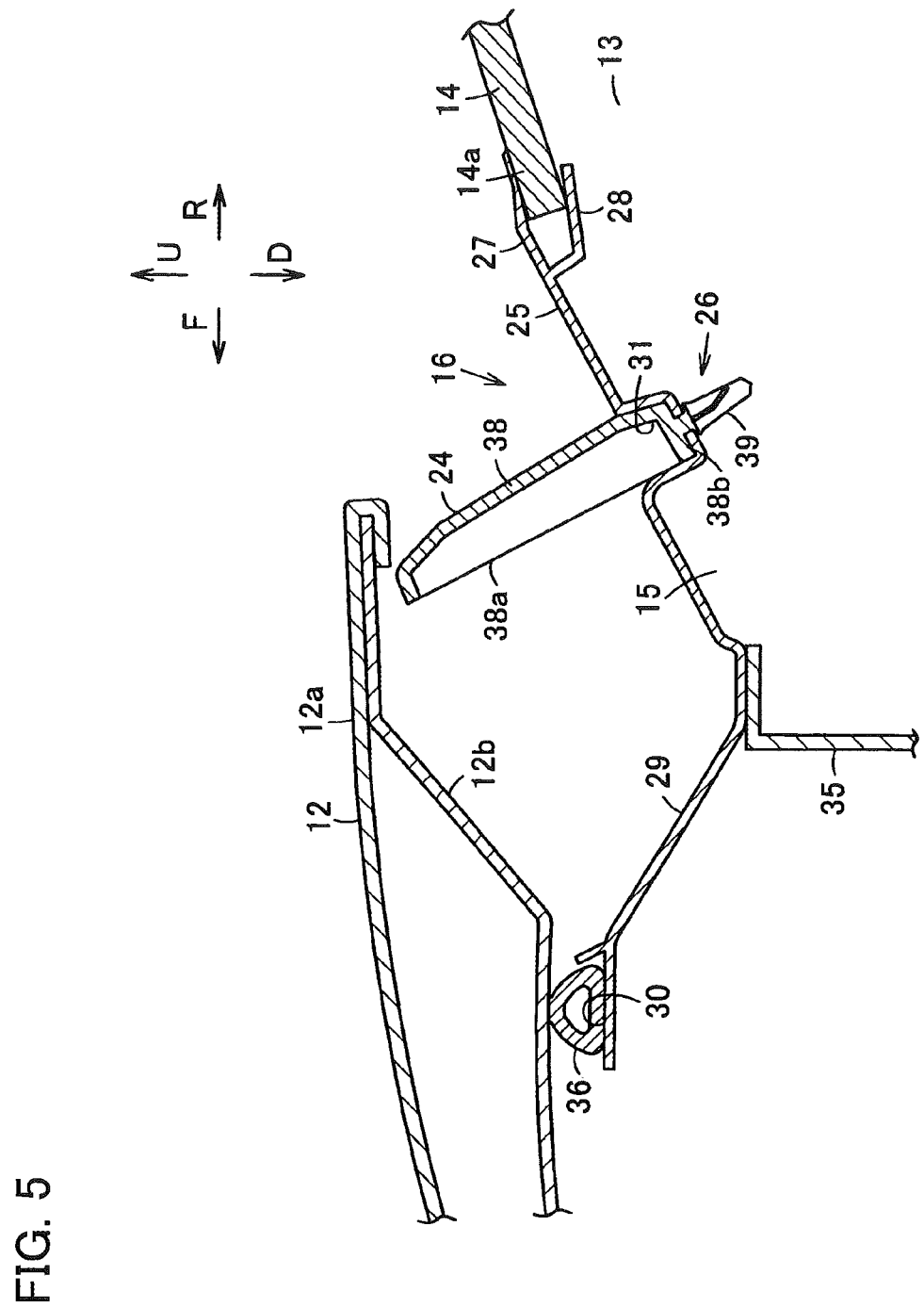
FIG. 5 is a cross-sectional view showing the part installed on a vehicle body.
Figure 6:
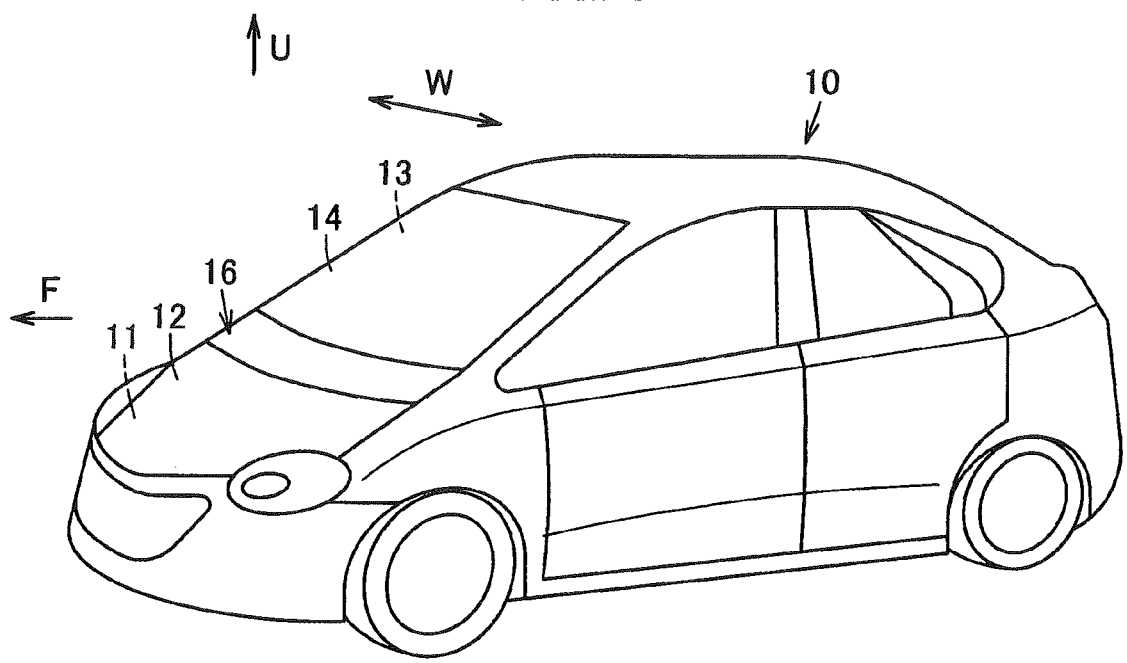
FIG. 6 is a perspective view of a vehicle on which the part is installed.

As shown in FIG. 4 to FIG. 6, a vehicle body 10 of a vehicle (an automobile/car) includes a cowl top cover 16 as a part for a vehicle. The cowl top cover 16 covers a cowl portion 15 between a hood 12 and a front windshield 14. The hood 12 covers over an engine compartment 11. The front windshield 14 is disposed on a front side of a passenger compartment 13. Note that "front (forward)", "rear (rearward)", "up (upward)", "down (downward)", "left (leftward)" and "right (rightward)" directions will be explained based on a running direction of the vehicle body 10, hereinafter. In the drawings, an arrow F indicates "front", an arrow R indicates "rear", an arrow U indicates "upper", an arrow D indicates "down", and a double arrow W indicates a vehicle width direction (i.e. both sides direction/left-right direction).

The cowl portion 15 is also called as an air box, and formed to have a gutter shape opened upward by a metal cowl to panel as a vehicle body member. An air intake port of an air conditioner that introduces outside air into the passenger compartment 13 is connected to the cowl portion 15. A motor for driving a wiper arm and so on are disposed on a right side of the cowl portion 15.

The hood 12 is an engine hood that is installed on a front section of the vehicle body 10, and openable and closable. The hood 12 covers the engine compartment 11 when being closed. The hood 12 is formed by a hood outer panel 12a and a hood inner panel 12b. The hood outer panel 12a is located on an outer side (i.e. an upper side) in a closed state of the hood 12. The hood inner panel 12b is located on an inner side (i.e. a lower side) in a closed state of the hood 12 while generally forming a small gap with the hood outer panel 12a. The hood outer panel 12a and the hood inner panel 12b are made as separated parts from each other and then integrated with each other. The hood outer panel 12a and the hood inner panel 12b may be made as a single part in which the above-mentioned panels 12a and 12b are integrated with each other.

The cowl top cover 16 is formed of hard synthetic resin for example, and covers over the cowl portion 15 (i.e. the cowl top panel) to improve appearance. The cowl top cover 16 is formed to have a long panel shape and extended along the cowl portion 15 in the vehicle width direction of the vehicle body 10 (see FIG. 4A and FIG. 4B). The cowl top cover 16 includes a vertical wall member 24 as a first part and a cover main body 25 as a second part. The vertical wall member 24 and the cover main body 25 are engaged with other by an engagement structure 26 to construct the cowl top cover 16. The cowl top cover 16 is provided with a planar portion 27, a hold portion 28 on a lower side of the planar portion 27, and a shield portion 29 extended from the planar portion 27.

The cowl top cover 16 is provided also with a hood seal planar portion 30 extended from the shield portion 29, and a groove portion 31. The cowl top cover 16 may be provided with an air intake port 32 and wiper pivot holes 33. The cowl top cover 16 partitions between a front edge 14a of the front windshield 14 and the hood 12 (i.e. between the engine compartment and the cowl portion 15) while covering, at a position of the front edge 14a, the cowl portion 15 positioned above the cowl top panel.

The planar portion 27 is formed to have a planar shape extending along a longitudinal direction, and inclines to be almost parallel to the front windshield 14. The hold portion 28 is provided at a rear portion of the planar portion 27 and faces to the front windshield 14. The hold portion 28 receives the front edge 14a of the front windshield 14 between itself and the planar portion 27. The hold portion 28 is protruded rearward from the lower surface of the planar portion 27. The shield portion 29 is extended obliquely forward and upward from a front edge of the planar portion 27. A lower portion of the shield portion 29 is supported by a vehicle body member 35 from beneath.

The hood seal planar portion 30 is extended forward from a front edge of the shield portion 29 to have a planar shape. A hood seal member 36 is attached on an upper surface of the hood seal planar portion 30, and a lower surface of a rear end portion of the hood 12 is pressed onto the hood seal member 36. The hood seal member 36 clings to the closed hood 12 in air-tight and liquid-tight manners to shield odors and heated air from the engine compartment 11. The vertical wall member 24 is attached to the groove portion 31 of the cover main body 25. The groove portion 31 is formed on the planar portion 27 to have a give depth, and extends longitudinally in the vehicle width direction. The groove portion 31 extends from one end portion of the cowl top cover 16 toward another end portion thereof along a longitudinal direction (the vehicle width direction). The groove portion 31 runs over the center of the cowl top cover 16, but doesn't reach the other end portion of the cowl top cover 16.

The air intake port 32 can introduce outside air into the cowl portion 15. The air intake port 32 is disposed beside the groove portion 31 and on the other end side of the cowl top cover 16, for example. The air intake port 32 is formed to have (mesh) grids, for example. A rotational shaft of a wiper arm is inserted through the wiper pivot hole 33. The plural (two) wiper pivot holes 33 may be formed so as to interpose the air intake port 32 therebetween, for example.

As shown in FIG. 1 to FIG. 5, the vertical wall member 24 that configures the engagement structure 26 is integrally molded by a soft synthetic resin such as TPE (thermoplastic elastomer) to have a plate (flap) shape. The vertical wall member 24 has a function of preventing something undesired, water, snow and so on from entering into the engine compartment 11 and a function of absorbing a downward load applied to the hood 12 upon a vehicle collision. The vertical wall member 24 extends longitudinally in the vehicle width direction, and is integrally fixed with the groove portion 31 on an upper side of the cover main body 25. The vertical wall member 24 includes a vertical wall member main body 38 as a main body of the first part, and insertion portions 39 that configure the engagement structure 26.

The vertical wall member main body 38 is formed to have a plate shape, and provided with ribs 38a in order to reinforce itself. The plural ribs 38a are provided at intervals in a longitudinal direction (the vehicle width direction) of the vertical wall member main body 38. In a state where the vertical wall member 24 is attached to the cover main body 25, the vertical wall member main body 38 has its thickness in the front-to-rear direction and the ribs 38a are located on the front side of the vertical wall member main body 38. In a state where the vertical wall member 24 is attached to the cover main body 25, the vertical wall member main body 38 rises from the cover main body 25 in a direction intersecting with (almost perpendicular to) the cover main body 25 (the planar portion 27), and its upper end is located under a rear end of the hood 12 so as to face to the rear end.

In addition, the vertical wall member main body 38 is provided integrally with a seating portion 38b along its edge along the longitudinal direction. The seating portion 38b is bent in a direction perpendicular to the vertical wall member main body 38. The seating portion 38b is positioned at the lower portion of the vertical wall member main body 38 in a state where the vertical wall member 24 is attached to the cover main body 25, and stacked on a bottom of the groove portion 31. The insertion portions 39 are integrally formed on the seating portion 38b.

The plural insertion portions 39 are protruded from the vertical wall member main body 38 (the seating portion 38b). Namely, the plural insertion portions 39 are provided on the vertical wall member main body 38 (the vertical wall member 24) at intervals along its longitudinal direction. Each of the insertion portions 39 includes a support post 41 as an insertion portion main body and plural protrusions 42 protruded from a circumferential side face of the support post 41 (see FIG. 2).

The support post 41 protrudes along an insertion direction (indicated by an arrow A in FIG. 1) of the insertion portion 39 into an after-explained receive portion 45. In the present embodiment, the support post 41 protrudes in a direction intersecting with (perpendicular to) the seating portion 38b. Therefore, the support post 41 protrudes downward from the vertical wall member main body 38. In addition, the support post 41 is formed to have a cylindrical shape, for example. Further, the support post 41 has a given length with respect to the vertical wall member main body 38 (seating portion 38b).

Each of the protrusions 42 is a rib formed along a protrusion direction of the support post 41. The plural protrusions 42 are provided for each support post 41. Each of the protrusions 42 is formed so that its portion on a free end side (a lower end side) of the support post is twisted with respect to its portion on a base end side (an upper end side) of the support post 41. Namely, each of the protrusion 42 integrally includes an inclined portion 47 that is positioned at the free end side of the support post 41 and inclined with respect to the insertion direction of the support post 41, and a protrusion main body 48 that is positioned on the base end side of the support post 41 and extends along the insertion direction of the support post 41.

In addition, each of the protrusions 42 may have an anti-pullout portion 49 that is positioned on the base end side of the support post 41 and formed along a direction intersecting with (perpendicular to) the insertion direction of the support post 41. Further, in the present embodiment, the four protrusions 42 are disposed at almost even intervals along a circumferential direction of the support post 41 in each of the support posts 41. The protrusions 42 are provided integrally with the vertical wall member 24, and thereby have elasticity to be deformable due to the material of which the vertical wall member 24 is made.

Figure 1A:
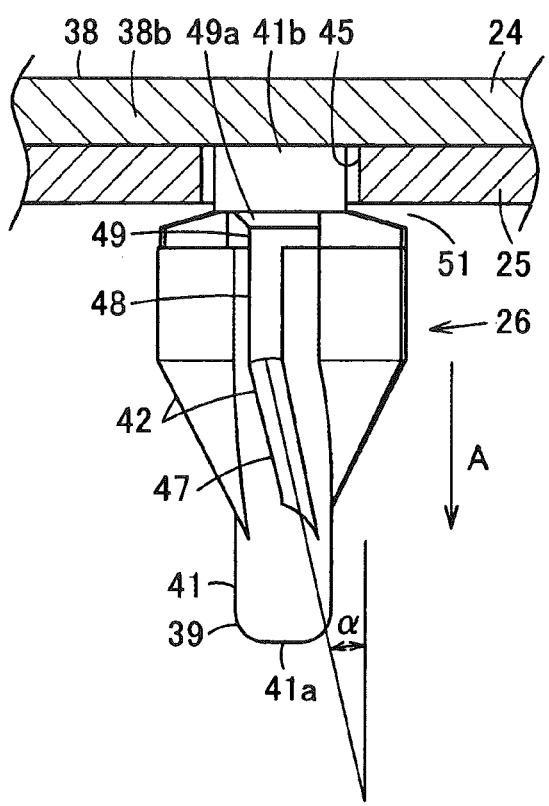
FIG. 1A is a side view of an engagement structure according to a first embodiment.
Figure 1B:
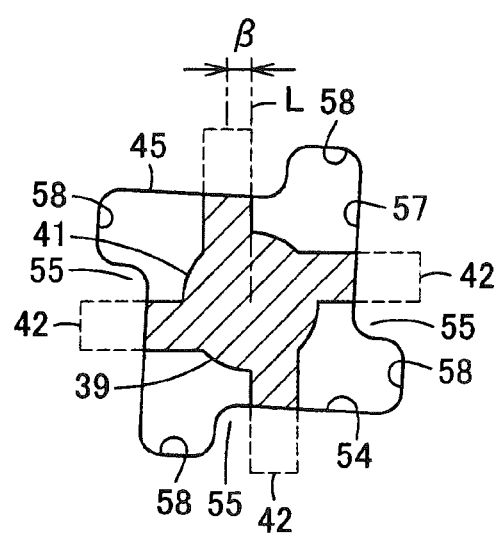
FIG. 1B is a horizontal cross-sectional view of the engagement structure.
Figure 2:
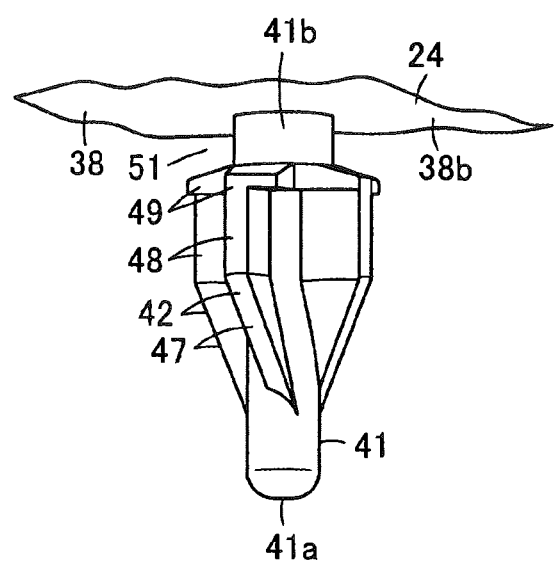
FIG. 2 is a perspective view of an insertion portion of the engagement structure.
Figure 3A:
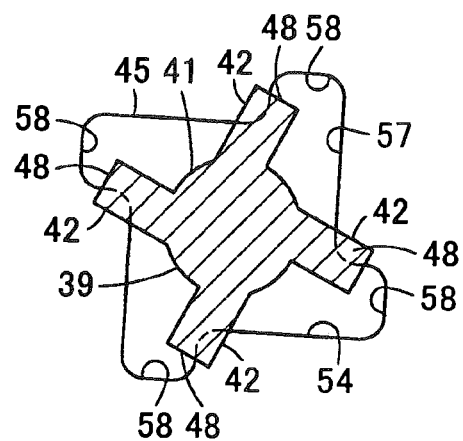
FIG. 3A is a horizontal cross-sectional view of the insertion portion (insertion initial stage)
Figure 3B:
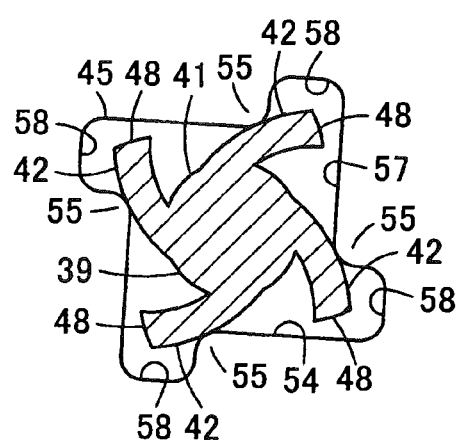
FIG. 3B is a horizontal cross-sectional view of the insertion portion (insertion middle stage)
Figure 3C:
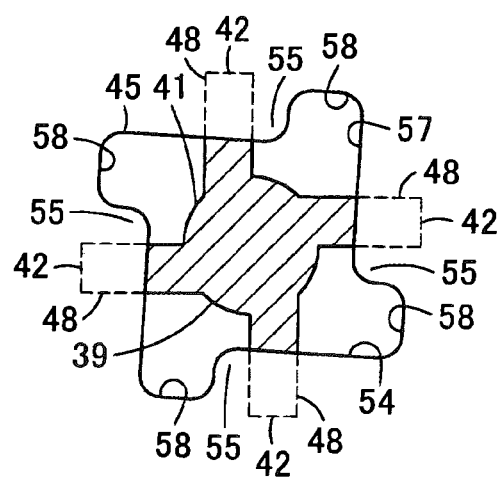
FIG. 3C is a horizontal cross-sectional view of the insertion portion (insertion completed)

The inclined portion 47 is inclined from the almost middle of the protrusion 42 toward the free end 41a of the support post 41 to form a given angle α with respect to the insertion direction of the insertion portion 39 (i.e. the axial direction of the support post 41) (see FIG. 1A).

The protrusion main body 48 is extended from au upper end of the inclined portion 47 toward the base end 41b of the support post 41 along a direction almost parallel to the insertion direction of the insertion portion 39 (i.e. the axial direction of the support post 41). When viewing along the center axis of the support post 41, each of the protrusion main bodies 48 is disaligned with respect a radiation direction from the center axis of the support post 41 (see FIG. 3C and FIG. 1B). Namely, the protrusion main body 48 is located to be displaced by a given distance ß with respect to a center line L passing through the center axis of the support post 41 (see FIG. 1B). Therefore, the protrusion main body 48 protrudes outward from the circumferential side face of the support post 41 and extends along a direction perpendicular to the radiation direction. In addition, the protrusion main body 48 is located slightly displaced from the base end 41b toward the free end 41a. Therefore, a space 51 where the base end 41b of the support post 41 is exposed is formed between the protrusion main body 48 and the vertical wall member main body 38 (the seating portion 38b).

The anti-pullout portion 49 prevents the insertion portion 39 already inserted into the receive portion 45 from being pulled out from the receive portion 45. The anti-pullout portion is extended from an end of the protrusion main body 48 on an opposite side to the inclined portion 47 (i.e. from the end on a side of the base end 41b of the support post 41). The anti-pullout portions 49 are disposed on the side face of the support post 41 along its circumferential direction. Namely, the anti-pullout portions 49 are positioned along a lower portion of the space 51. In addition, an upper portion of the anti-pullout portion 49 that faces to the seating portion 38b (the cover main body 25) forms a sloped surface 49a. The sloped surface 49a is sloped outward in a radial direction and downward so as to be gradually distanced from the seating portion 38b (the cover main body 25). By forming the sloped surfaces 49a, tottering of the vertical wall member 24 can be prevented while the vertical wall member 24 is engaged with the cover main body 25.

The cover main body 25 is integrally molded by a harder synthetic resin such as PP (polypropylene) than the synthetic resin of the vertical wall member 24. The cover main body 25 may have an appropriate shape according to dimensions of the engine compartment 11 and the hood 12 and arrangements of the wipers. However, in the present embodiment, the cover main body 25 is disposed continuously from the front edge 14a of the front windshield 14 so that its longitudinal direction is extended along the vehicle width direction. The cover main body 25 is provided with the planar portion 27, the hold portion 28, the shield portion 29, the hood seal planar portion 30, the groove portion 31, the air intake port 32 and the wiper pivot holes 33, as explained above. The cover main body 25 is also provided with the receive portions 45 that configure the engagement structure 26 and receive the insertion portions 39 of the vertical wall member 24, respectively.

The plural receive portions 45 are provided so as to be associated with the insertion portions 39, respectively.

Namely, the plural receive portions 45 are provided on the cover main body 25 at intervals along its longitudinal direction. Each of the receive portions 45 is provided with an opening 54 and overhangs 55 that prevent the insertion portion 39 already inserted into the opening 54 from being pulled out. The opening 54 is formed so as to penetrate the bottom of the groove portion 31. The opening 54 is composed of an opening main portion 57 and cutouts 58. The support post 41 is inserted into the opening main portion 57. The opening main portion 57 is larger than an outline of the support post 41, and has an opening area smaller than an outline of the insertion portion 39 including the protrusions 42. In the present embodiment, the opening main portion 57 is formed to have a quadrangle shape, for example.

The cutouts 58 are formed on an (inner) edge of the opening main portion 57, and the protrusions 42 are inserted the cutouts 58, respectively, when the support post 41 is inserted into the opening main portion 57. Therefore, the plural cutouts 58 are formed so as to be associated with the protrusions 42, respectively. Each of the cutouts 58 has a shape larger than an outline of the protrusion 42. In the present embodiment, the four cutouts 58 are formed with respect to the single opening main portion 57. Each of the cutouts 58 is formed by cutting out the edge of the opening main portion 57 so as to have a quadrangle shape.

In the present embodiment, the cutouts 58 are formed by outwardly cutting four corners of the opening main portion 57, respectively. Further, the cutouts 58 are arranged symmetrically with respect to the center of the opening main portion 57 (the opening 54). In the present embodiment, when viewing from the center of the opening main portion 57 (the opening 54) toward the corners of the opening main portion 57, each of the cutouts 58 is formed by cutting each equivalent side of the corners. In other words, each of the cutouts 58 is disposed at a position defined in every rotation of 90° (=360°/[the number of the protrusions 42]) about the center of the opening main portion 57 (the opening 54).

Each of the overhangs 55 is disposed adjacently to the opening main portion 57 so as to contact with the protrusion 42 being inserted into the cutout 58 in a direction perpendicular to the insertion direction of the protrusion 42. Therefore, the plural overhangs 55 are provided so as to be associated with the protrusions 42. In the present embodiment, the four overhangs 55 are provided with respect to the single opening 54. The overhangs 55 are peripheries of the opening main portion 57 adjacent to the cutouts 58, respectively. The overhangs 55 prevent, on a back surface of the cover main body 25, the protrusions 42 from being pulled out from the receive portion 45 due to the elastic restorations of the protrusions 42 that have passed through the cutouts 58.

The cowl top cover 16 is assembled by engaging the vertical wall member 24 and the cover main body 25, molded independently from each other, by the engagement structures 26. Specifically, the insertion portions 39 protruded from the vertical wall member 24 are aligned with the receive portions 45 formed on the cover main body 25, and then the vertical wall member 24 is pressed into the cover main body 25 so that the insertion portions 39 are inserted into the receive portions 45, respectively.

In each of the engagement structures 26 during this process, the inclined portions 47 (each formed on a portion of the protrusion 42 closer to the free end 41*a* of the support post 41) are formed in an inclined manner, and thereby insertion pressures are applied to lower portions of the inclined portions 47 by the overhangs 55. Therefore, each distortion direction of the protrusions 42 is restricted by the overhang 55, and each of the protrusions 42 are subject to be distorted. Along with the insertion of the free end 41*a* of the support post 41 into the opening main portion 57, the overhangs 55 push the inclined portions 47 in the directions perpendicular to the insertion portion, respectively, so that the protrusions 42 are bent so as to escape toward the cutouts 58, respectively (see FIG. 3A).

Due to these bends of the protrusions 42, the protrusion main bodies 48 are also bent toward the cutouts 58, respectively, subsequently to the inclined portions 47, and thereby the insertion portion 39 is twisted (slightly rotated). The protrusion main bodies 48 are also pushed by the overhangs 55, and thereby escape toward the cutouts 58 (see FIG. 3B). Therefore, the insertion force of the insertion portion 39 into the receive portion 45 is reduced.

When the insertion portion 39 has passed through the receive portion 45, the twisted insertion portion 39 restores its shape, so that the protrusions 42 return from the cutouts 58 toward the back surface of the overhangs 55, respectively, in the circumferential direction. The protrusion main bodies 48 and the anti-pullout portions 49 of the protrusions 42 are positioned at the back surfaces of the overhangs 55, respectively (see FIG. 3C). As the result, the vertical wall member 24 is engaged integrally with the cover main body 25 by the engagement structures 26, and thereby the protrusions 42 stick in a pull-out direction of the insertion portion 39 from the receive portion 45. The protrusions 42 don't deform and ensure sufficient overlaps with the overhangs 55, and thereby the insertion portion 39 becomes hardly pulled out from the receive portion 45.

The cowl top cover 16 completed as explained above is installed on the vehicle body while the front edge 14*a* of the front windshield 14 is inserted into a gap between the planar portion 27 and the hold portion 28. In a state where the hood 12 is closed, the hood seal member 36 is deformed and clings to the closed hood 12 in order to shield odors and heated air from the engine compartment 11 and thereby prevent the odors and the heated air from being introduced into the passenger compartment 13 through the air intake port 32.

In this manners, the cowl top cover 16 covers the cowl portion 15 and thereby water is prevented from entering into the passenger compartment 13 and so on. In addition, the hood seal member 36 deforms and clings to the hood 12 when the hood 12 is closed, and thereby the odors and heated air from the engine compartment 11 is shielded in order to prevent the odors and the heated air from being introduced into the passenger compartment 13 through the air intake port 32.

In the present embodiment, the protrusions 42 having elasticity are provided on the circumferential side face of the support post 41 along the protrusion direction of the support post 41 protruding along the insertion direction into the receive portion 45. In addition, the plural cutouts 58 into which the protrusions 42 are (to be) inserted are disposed on the edge of the opening main portion 57 of the opening 54 of the receive portion 45. Further, the overhangs 55 are provided at the opening main portion 57 adjacently to the cutouts 58 so as to contact with the protrusions 42 being inserted into the cutouts 58 in the directions perpendicular to the insertion direction of the protrusions 42. According to these configurations, while the insertion portion 39 is inserted into the opening 54 of the receive portion 45, the protrusions 42 are pushed by the overhangs 55 and thereby can be bent into the cutouts 58, respectively.

Therefore, the insertion portion 39 can pass thorough the receive portion 45 with a small insertion force, and the protrusions 42 after passing through the receive portion 45 can be held by the overhangs 55 due to their elastic restorations from their bent states while ensuring sufficient overlaps with the overhangs 55. As the result, it becomes possible to engage the vertical wall member 24 with the cover main body 25 effectively with superior workability.

In Addition, each portion of the protrusions 42 on a side of the free-end of the support post 41 is formed as the inclined portion 47 inclined with respect to the insertion direction of the support post 41, and each portion of the protrusions 42 on a side of the base of the support post 41 is formed as the protrusion main body 48 positioned along the insertion portion of the support post 41. Since each of the protrusions 42 is twisted at its inclined portion 47 and its protrusion main body 48, the protrusions 42 are pushed by the overhangs 55 and then easily bent into the cutouts 58 only by inserting the insertion portion 39 into the opening 54 of the receive portion 45. Therefore, the insertion portion 39 can pass through the receive portion 45 with the small insertion force. As a result, it becomes possible to engage the vertical wall member 24 with the cover main body 25 effectively with superior workability.

Further, since the insertion portion 39 can be easily inserted into the opening 54 due to deformations of the protrusions 42 and twisting of the insertion portion 39, it is not needed to make the opening 54 large and thereby a relational position between the insertion portion(s) 39 and the opening(s) 54 are hardly changed when the vertical wall member 24 is fixed with the cover main body 25. Therefore, positional accuracy of the vertical wall member 24 can be ensured.

Figure 7:
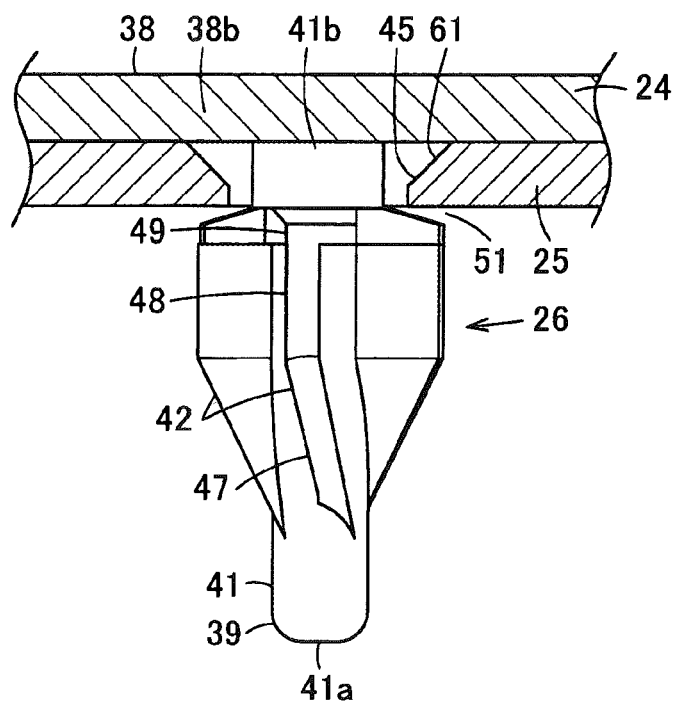
FIG. 7 is a side view of an engagement structure according to a second embodiment.

Note that, as shown in a second embodiment shown in FIG. 7, tapered surfaces 61 can be formed on the inner edge of the opening 54 in addition to that in the above first embodiment. Each of the tapered surfaces 61 is a tapered portion that is inclined so as to protrude inward and toward the insertion direction of the insertion portion 39 into the opening 54. In this case, the insertion portion 39 is guided to the opening 54 along the insertion direction by the tapered surface 61, and thereby can be easily inserted into the opening 54.

Figure 8:
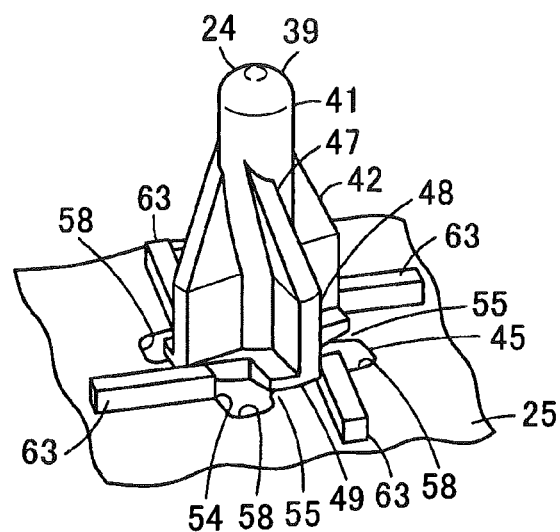
FIG. 8 is a perspective view of an engagement structure according to a third embodiment.

Next, a third embodiment will be explained with reference to FIG. 8. Note that equivalent or identical elements of the present embodiment to those of the above embodiments will be labelled with identical reference numbers, and thereby their explanations will be omitted. In the third embodiment, anti-rotation ribs 63 are provided, as anti-rotation portions, on a back surface of the cover main body 25 (on a back surface of the receive portion 45). The anti-rotation ribs 63 prevent the insertion portion 39 that is held in the receive portion 45 from rotating in the circumferential direction.

Each of the anti-rotation ribs 63 is protruded, with respect to the cutout 58 associated thereto, at a position of the overhangs 55 that associated with the cutout 58. Namely, the plural anti-rotation ribs 63 are provided so as to be associated with the protrusions 42. In addition, each of the anti-rotation ribs 63 is provided longitudinally along a cutout direction of the cutout 58.

When the insertion portions 39 protruded from the vertical wall member 24 are aligned with the receive portions 45 provided on the cover main body 25 and then the vertical wall member 24 is pushed into the cover main body 25 so as to insert the insertion portions 39 into the receive portions 45, the overhangs 55 push the inclined portions 47 in the direction perpendicular to the insertion direction and thereby the protrusions 42 are bent so as to escape toward the cutouts 58. Following the bending of the inclined portions 47 of the protrusions 42, the protrusion main bodies 48 of the protrusions 42 are sequentially bent so as to escape toward the cutouts 58 and the insertion portions 39 are twisted (slightly rotated). Therefore, the protrusion main bodies 48 escape to the cutouts 58 while being guided by the overhangs 55.

When the insertion portion 39 has passed through the receive portion 45, the insertion portion 39 elastically restores from its twisted state. Each of the protrusions 42 returns circumferentially to a side of the overhang 55 from the cutout 58 associated thereto, and thereby is located at the back surface of the overhang 55. In this state, the anti-rotation ribs 63 contact, in the direction intersecting with (perpendicular to) the insertion direction of the insertion portion 39, with the protrusions 42 (the protrusion main bodies 48 and the anti-pullout portions 49) of the insertion portion 39 held in the opening 54 of the receive portion 45, respectively, and thereby the insertion portion 39 is prevented from rotating.

As explained above, on the back surface of the cover main body 25, provided are the anti-rotation ribs 63 that contact, in the direction perpendicular to the insertion direction of the insertion portion 39, with the protrusions 42 of the insertion portion 39 held in the opening 54 of the receive portion 45 at opposite positions to the cutouts 58, respectively. Therefore, relative rotations between the vertical wall member 24 and the cover main body 25 can be prevented by the contacts between the anti-rotation ribs 63 and the protrusions 42.

Figure 9:
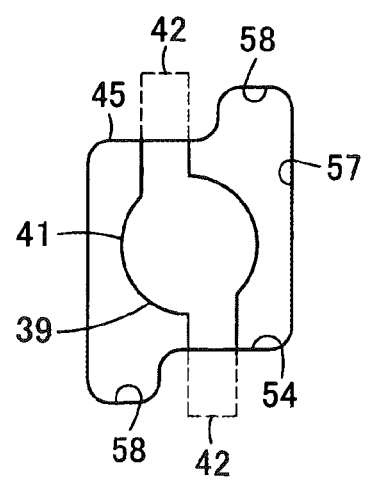
FIG. 9 is a horizontal cross-sectional view of an engagement structure according to a fourth embodiment.

Note that, in the above embodiments, the number of the protrusions 42 is not limited to four, and it is sufficient that the protrusions 42 are provided in a plurality for a single engagement structure 26. In such a case, the protrusions 42 are preferably disposed in a well-balanced manner, without being disposed eccentrically in a disproportionate manner with respect to the center of the support post 41. For example, as shown in a fourth embodiment shown in FIG. 9, two protrusions 42 may be provided for a single engagement structure 26. In this case, two cutouts 58 are also provided. By providing the two protrusions 42 symmetrically with respect to the center of the support post 41 in this configuration, it becomes possible to achieve similar advantages to those brought by the above embodiments by its simpler configuration.

In addition, the cowl top cover 16 may be provided at a section of the vehicle body 10 other than its front section. For example, the cowl top cover 16 may be provided so as to cover a cowl top portion between a rear windshield and a rear trunk lid. Further, the engagement structure(s) 26 can be applied not only to the cowl top cover 16 but also to various parts for a vehicle in order to engage parts with each other.

The present invention is not limited to the above-mentioned embodiment, and it is possible to embody the present invention by modifying its components in a range that does not depart from the scope thereof. Further, it is possible to form various kinds of inventions by appropriately combining a plurality of components disclosed in the above-mentioned embodiment. For example, it may be possible to omit several components from all of the components shown in the above-mentioned embodiment. Scope of the present invention is determined in the context of the claims.

What is claimed is:

1. An engagement structure for engaging a first part with a second part comprising:
   a receive portion provided on the first part; and an insertion portion provided on the second part to be inserted into the receive portion and then fixed with the receive portion, wherein the insertion portion includes:

an insertion main body protruded in an insertion direction toward the receive portion, and a plurality of protrusions protruded from a side face of the insertion main body to extend along a protrusion direction of the insertion main body and having elasticity to be deformable, wherein each of the plurality of protrusions includes:

an inclined portion positioned at a free end side of the insertion main body and inclined with respect to the insertion direction of the insertion main body, wherein each inclined portion defines:

a first inclined face that forms an angle with respect to the side face of the insertion main body, the first inclined face is formed on a radial outer surface of each inclined portion, a portion of the first inclined face located at an insertion direction most edge of the inclined portion, the portion of the first inclined face connecting the first inclined portion to the side face of the insertion main body and the portion of the first inclined face being inclined with respect to the insertion direction of the insertion main body, and a second inclined face that is oriented orthogonal to the first inclined face, the second inclined face being inclined with respect to the insertion direction of the insertion main body; and the receive portion includes:

an opening provided with an opening main portion into which the insertion main body is inserted and a plurality of cutouts into which the protrusions are inserted when the insertion main body is inserted into the opening main portion, and a plurality of overhangs that are disposed adjacently to the opening main portion so as to contact with the protrusions being inserted into the cutouts in a direction perpendicular to the insertion direction of the protrusions and prevent, on a back surface of the receive portion, the protrusions from being pulled out due to elastic restorations of the protrusions that have passed through the cutouts.

2. The engagement structure according to claim 1, wherein each of the protrusions includes:

a protrusion main body positioned on a base end side of the insertion main body and extending along the insertion direction of the insertion main body.

3. The engagement structure according to claim 1, further comprising:

a plurality of anti-pullout portions extended from opposite ends of the protrusion main bodies to the inclined portions, respectively, along a circumferential direction of the insertion direction.

4. The engagement structure according to claim 1, wherein the receive portion further includes a tapered portion formed on an inner edge of the opening and inclined so as to protrude inward and toward the insertion direction of the insertion portion.

5. The engagement structure according to claim 1, further comprising:

anti-rotation portions provided on a back surface of the receive portion of the first part to contact, in a direction perpendicular to the insertion direction of the insertion portion, with the protrusions of the insertion portion that have inserted in the opening at opposite positions to the cutouts, respectively.

* * * * *